United States Patent
Stubbs et al.

(10) Patent No.: US 8,402,467 B2
(45) Date of Patent: Mar. 19, 2013

(54) SYSTEM AND METHOD FOR PROVIDING FAULT RESILIENT PROCESSING IN AN IMPLANTABLE MEDICAL DEVICE

(75) Inventors: Scott R. Stubbs, Maple Grove, MN (US); Kenneth P. Hoyme, Plymouth, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 1018 days.

(21) Appl. No.: 12/417,702

(22) Filed: Apr. 3, 2009

(65) Prior Publication Data

US 2009/0254915 A1 Oct. 8, 2009

Related U.S. Application Data

(60) Provisional application No. 61/042,551, filed on Apr. 4, 2008.

(51) Int. Cl.
*G06F 9/50* (2006.01)
(52) U.S. Cl. ........................................................ 718/103
(58) Field of Classification Search ........................ None
See application file for complete search history.

(56) References Cited

U.S. PATENT DOCUMENTS

| | | | |
|---|---|---|---|
| 5,652,885 A * | 7/1997 | Reed et al. | 713/1 |
| 5,933,627 A * | 8/1999 | Parady | 712/228 |
| 6,336,903 B1 | 1/2002 | Bardy | |
| 6,368,284 B1 | 4/2002 | Bardy | |
| 6,398,728 B1 | 6/2002 | Bardy | |
| 6,411,840 B1 | 6/2002 | Bardy | |
| 6,440,066 B1 | 8/2002 | Bardy | |
| 6,584,356 B2 | 6/2003 | Wassmund et al. | |
| 2007/0112599 A1 * | 5/2007 | Liu et al. | 705/2 |

OTHER PUBLICATIONS

Kosar, Tevfik. "CSC 4103—Operating Systems". Feb. 27, 2007. 3 pages.*
"ARINC Specification 653P1-2, Avionics Application Software Standard Interface Part 1—Required Sevices", *Airlines Electronic Engineering Committee* Mar. 7, 2006, pp. 1-244.
Divito, Ben L., "A Formal Model of Partitioning for Integrated Modular Avionics", *Technical Report: NASA-98-cr208703* Aug. 1998, pp. 1-81.
Johnson, Leslie A., "DO-178B—Software Considerations in Airborne Systems and Equipment Certification", www.stsc.hill.af.mil/crosstalk/1998/10/schad.asp Oct. 1998, pp. 1-10.
Keuning, M.F.R., "Software partitioning for safety-critical airborne systems in practice", *NLR-TP-2000-010* Jan. 2000, pp. 1-18.
Lee, Insup et al., "High-Confidence Medical Device Software and Systems", *Computer* Apr. 2006, vol. 39, No. 4, pp. 33-38.
Rushby, John, "Partitioning in Avionics Architectures: Requirements, Mechanisms and Assurance", *Final Report: NASA/CR-1999-209347* Mar. 2000, pp. 1-69.

* cited by examiner

*Primary Examiner* — Robert Fennema
(74) *Attorney, Agent, or Firm* — Pauly, Devries, Smith & Deffner, L.L.C.

(57) ABSTRACT

A system and method for providing fault resilient processing in an implantable medical device is provided. A processor and memory store are provided in an implantable medical device. Separate times on the processor are scheduled to a plurality of processes. Separate memory spaces in the memory store are managed by exclusively associating one such separate memory space with each of the processes. Data is selectively validated prior to exchange from one of the processes to another of the processes during execution in the separate processor times.

18 Claims, 7 Drawing Sheets

SYSTEM AND METHOD FOR PROVIDING FAULT RESILIENT PROCESSING IN AN IMPLANTABLE MEDICAL DEVICE

This application claims the benefit of U.S. Provisional Application No. 61/042,551, filed Apr. 4, 2008, the content of which is herein incorporated by reference in its entirety.

FIELD

The invention relates in general to implantable medical devices and, specifically, to a system and method for providing fault resilient processing in an implantable medical device.

BACKGROUND

Fully implantable medical devices (IMDs) function autonomously through preprogrammed control over an extended time period. Ensuring continuity of function in IMDs, particularly life-sustaining therapy, is essential, such as in cardiac rhythm management (CRM) devices that provide endocardial electrical stimuli in response to sensed cardiac arrhythmias. Pacemakers, for instance, manage bradycardia by delivering pacing stimuli to restore normal sinus rhythm. Similarly, implantable cardioverter defibrillators (ICDs) treat tachycardia through high-energy cardioversion, defibrillation shocks, or anti-tachycardia pacing.

IMD internal architectures have continually evolved in pace with advances in microprocessor design. IMD architectures, in general, have migrated towards a programmable control model that utilize a central microprocessor to perform a range of functions built-in or downloaded. In addition, increases in onboard memory capacity have enabled tracking of a wider range of data, while radio frequency (RF) telemetry has provided increased bandwidth for data exchange and improved reporting frequency. Moreover, core therapeutic life-sustaining functionality has increasingly been supplemented with ancillary non-critical functions, such as routine physiometric and environmental monitoring.

The increase in IMD functionality has also increased the risk of failure due to programmatic and design errors or faults. General reliance is placed on a uniprocessor operating on a shared pool of memory under programmed control of different functions. Such reliance leaves open the risk that errors in one function could propagate to other, possibly critical, functions, including static errors, such as memory corruption, and runtime errors, such as process deadlock. Device reset is frequently the only recourse, but has many side effects, such as possible loss of some stored data, temporary interruption in therapy, and potential inability to return to full service due to the effects of the initial fault.

Conventional non-redundant IMD architectures focus on operation resumption and not error or fault containment. For instance, U.S. Pat. No. 6,584,356, issued Jan. 5, 2001, to Wassmund et al., discloses downloadable software support in a pacemaker, which includes modular features that control device operation and therapy functionality. The IMD employs a preemptive real time operating system with a scheduling mechanism that uses a priority inheritance protocol. Preemptive scheduling provides facilities to prevent process deadlock and unbounded priority inversion. Modular features can be added as downloadable software that is loaded into random access memory and provided access to the full range of functions available to existing firmware functions. Notwithstanding, the device lacks provisions to protect existing features against aberrant programmatic behaviors and teaches away from isolating errors or faults by persisting modular feature state in non-volatile storage to facilitate device reset in response to operational bugs.

SUMMARY

Fault propagation between processes executing on an IMD is substantially reduced by providing partitions that ensure completely separate address space and execution time. A high integrity kernel operates over a stored program computer architecture that includes a hardware-implemented memory management unit. Execution threads for each process are scheduled to form separate process partitions. Critical functions receive higher execution priority over non-critical functions. Critical functions are generally those functions that provide life-sustaining therapy to a recipient patient. Higher priority execution threads are cooperatively multitasked with execution paused while waiting for an asynchronous event or by voluntary relinquishment of the processor. Lower priority execution threads can be preemptively multitasked to prevent process starvation, or can also be cooperatively multitasked if event-driven execution is required. The memory space is discretely partitioned with execution threads executing within separate partitions. Process identifiers associate each execution thread with their allocated blocks of the memory space. Data can be written into the memory space by only a single kernel component that serializes write requests in order of receipt. Simultaneous read requests from different execution threads are permitted. Finally, data exchange between process partitions is validated to guard against data corruption. In general, more rigorous validation is applied to an "up-pass" of data, that is, data exchange from a non-critical or lower priority process to a critical or higher priority process. To decrease validation overhead, relaxed validation can be applied for a "down-pass" of data.

One embodiment provides a system and method for providing fault resilient processing in an implantable medical device. A processor and memory store are provided in an implantable medical device. Separate times on the processor are scheduled to a plurality of processes. Separate memory spaces in the memory store are managed by exclusively associating one such separate memory space with each of the processes. Data is selectively validated prior to exchange from one of the processes to another of the processes during execution in the separate processor times.

A further embodiment provides a system and method for partitioning an implantable medical device for fault resilient execution. A uniprocessor and interconnected memory store are provided in an implantable medical device. The memory store includes addressable memory locations. A plurality of processes are operationally separated. A criticality of function provided by each process is evaluated. Separate times for execution on the uniprocessor are scheduled to the processes in order of the criticality of function. The plurality of processes are physically separated. Discrete blocks of the addressable memory locations of the memory store are associated to each of the processes. Data sent from one of the processes to another of the processes is selectively validated during execution on the uniprocessor.

Still other embodiments will become readily apparent to those skilled in the art from the following detailed description, wherein are described embodiments by way of illustrating the best mode contemplated. As will be realized other and different embodiments are possible and their several details are capable of modifications in various obvious respects, all without departing from the spirit and the scope. Accordingly, the drawings and detailed description are to be regarded as illustrative in nature and not as restrictive.

DETAILED DESCRIPTION

Increases in implantable medical device (IMD) functionality over time have increased the risk of failure due to programmatic and design errors or faults. IMDs present a unique processing environment because unlike other types of processing environments external to the body, IMDs inherently have substantially limited processing, memory, and power resources. Due to these limitations, full redundancy is not a viable solution. Extra hardware components tax already-constrained resources and increase design complexity, while software redundancy provides only limited assurance against fault or error propagation.

Embodiments included herein can provide fault resilience within the context of the limited processing, memory, and power resources available in implantable medical device systems. Aspects of exemplary embodiments will now be described in greater detail.

In Situ Environment

Figure 1:
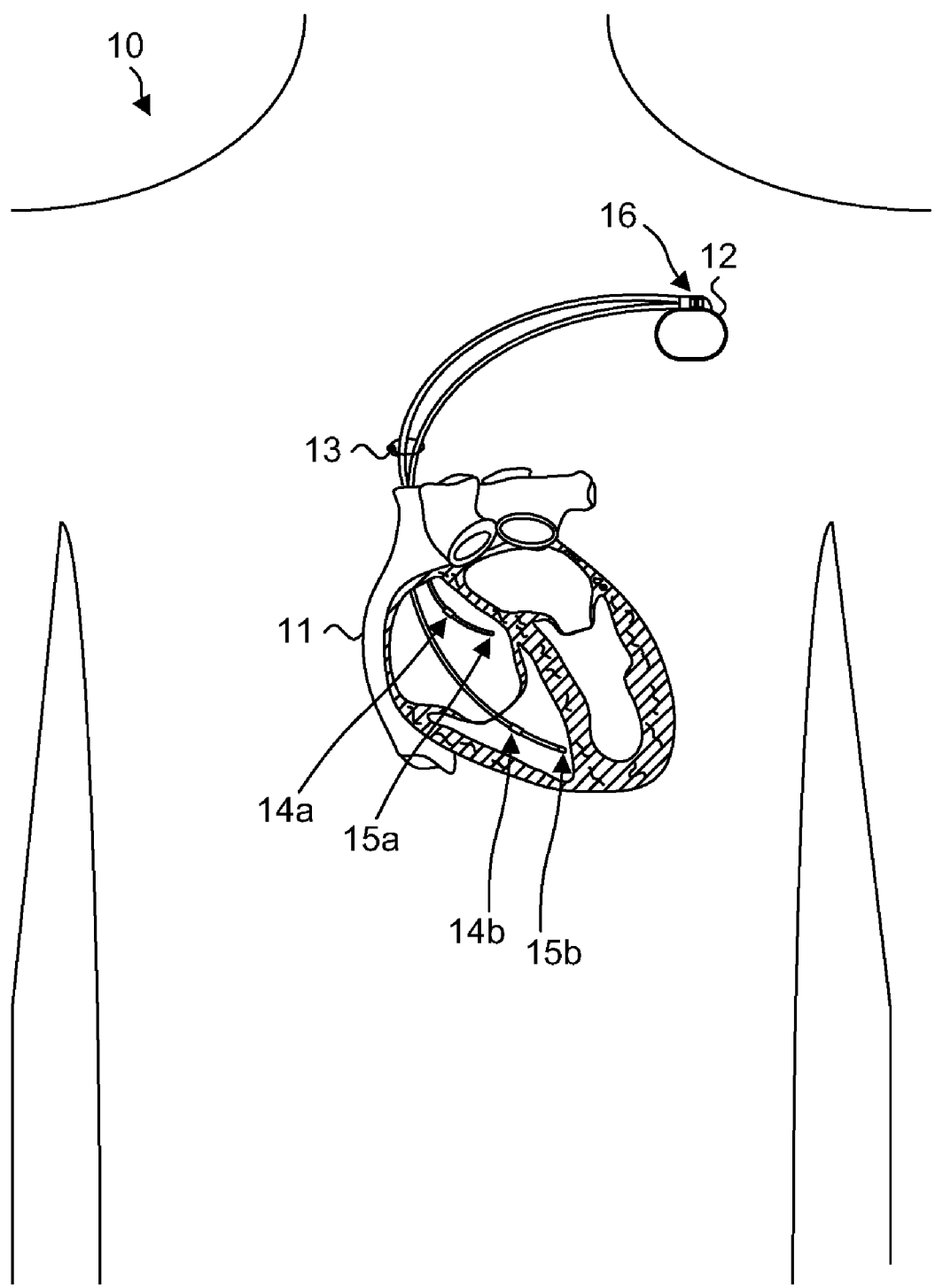
FIG. 1 is a block diagram showing, by way of example, an implantable medical device in situ.

Recent advances in microelectronics have increased the scope of functionality provided by IMDs, particularly CRM devices. FIG. 1 is a block diagram showing, by way of example, an implantable medical device 12 in situ. IMDs can include pacemakers, implantable cardioverter-defibrillators, cardiac resynchronization therapy devices, neuromodulation devices, implantable sensors, implantable monitors, and the like. Other IMD types are possible. IMDs can include active implantable medical devices. The term active implantable medical devices as used herein shall refer to implantable medical devices relying for functioning on a source of power other than that directly generated by the human body or gravity. Moreover, although described in relation to medical devices intended for providing cardio and cardiopulmonary diagnosis, therapy, or monitoring, the embodiments described apply generally to all fully implantable medical devices and sensors.

By way of example, the IMD 12 is surgically implanted in the chest, abdomen, or other bodily location of a patient 10 and includes a standardized coupling 16 to which endocardial pacing leads 13 are proximally connected. The endocardial pacing leads 13 provide monitoring within and deliver therapy to the patient's heart 11. Physiometry is measured through sensors 14a, 14b and electrical stimuli are delivered through electrodes 15a, 15b, which are each provided on the distal end of each pacing lead 13. The IMD 12 also encloses operational circuitry within a hermetically-sealed housing, as further described below with reference to FIG. 2.

The IMD 12 stores recorded patient data, such as monitored physiometry; observed environmental data, for instance, ambient temperature or time of day; and parametric information, including program code and parameters, device status, and operational characteristics. Periodically, the IMD 12 is interrogated by an external device, such as a in-clinic programmer or patient-operable interrogation device, such as a repeater, to retrieve recorded data and optionally download programming. Device interrogation can occur regularly per a schedule, or on demand under patient or attendant control. As well, interrogations can be performed on a monthly, weekly, or daily basis, or as frequently as appropriate or practical. The interrogator can either store downloaded data locally, or can forward the data to a centralized repository for further analysis or storage.

In a further embodiment, the patient data can be evaluated, either by the IMD 12, the interrogator, centralized server, or other device, for the occurrence of one or more chronic or acute health conditions, such as described in related, commonly-owned U.S. Pat. No. 6,336,903, to Bardy, issued Jan. 8, 2002; U.S. Pat. No. 6,368,284, to Bardy, issued Apr. 9, 2002; U.S. Pat. No. 6,398,728, to Bardy, issued Jun. 4, 2002; U.S. Pat. No. 6,411,840, to Bardy, issued Jun. 25, 2002; and U.S. Pat. No. 6,440,066, to Bardy, issued Aug. 27, 2002, the disclosures of which are incorporated by reference.

In a still further embodiment, the patient data is extracorporeally safeguarded against unauthorized disclosure to third parties, including during collection, assembly, evaluation, transmission, and storage, to protect patient privacy and comply with recently enacted medical information privacy laws, such as the Health Insurance Portability and Accountability Act (HIPAA) and the European Privacy Directive. At a minimum, patient health information that identifies a particular individual with health- and medical-related information is treated as protectable, although other types of sensitive information in addition to or in lieu of specific patient health information could also be protectable.

Physical Components

Figure 2:
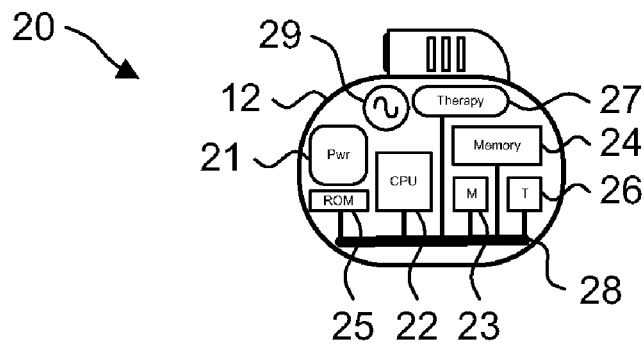
FIG. 2 is a block diagram showing the physical components of an implantable medical device.

Structurally, IMD functionality can be provided on a stored program computer architecture, which includes a centralized processor interconnected to a unitary memory store. FIG. 2 is a block diagram showing the physical components 20 of an IMD 12. The IMD 12 is structured with a von Neumann architecture. However, other forms of component architecture, including a Harvard architecture are possible.

Generally, the physical components 20 of an IMD includes a central processing unit (CPU) or simply "processor" 22, memory management unit (MMU) 23, random access memory ("memory") 24, read-only memory ("ROM") 25, transducer circuitry 26, and therapy control circuitry 27 interconnected over a common bus 28, plus ancillary physical components, including a power source 21 and oscillator 29. Other physical components are possible. The power source 21 is generally a battery, which provides a finite power supply for the operational circuitry. The oscillator 29 regulates internal device operation by controlling the timing of IMD operations.

At a component level, the CPU 22 implements the device's functionality, such as therapy delivery or physiometric monitoring, through programmed control. Program code is persistently stored in ROM 25 as firmware. Overall IMD operation is controlled through a high integrity kernel, as further described below with reference to FIG. 3. At runtime, program code is loaded into the memory 24 from the ROM 25 and dynamic storage in the memory 24 for data is allocated. The memory 24 is controlled on behalf of the CPU 22 by the MMU 23. The transducer 26 provides signal conversion for exchanging recorded patient data and programming parameters with external devices, such as a programmer or patient-operable repeater. Finally, the therapy control circuitry 27 implements core device functionality, such as physiometric monitoring and therapy delivery. Other operational functionality is possible.

Logical Components

Figure 3:
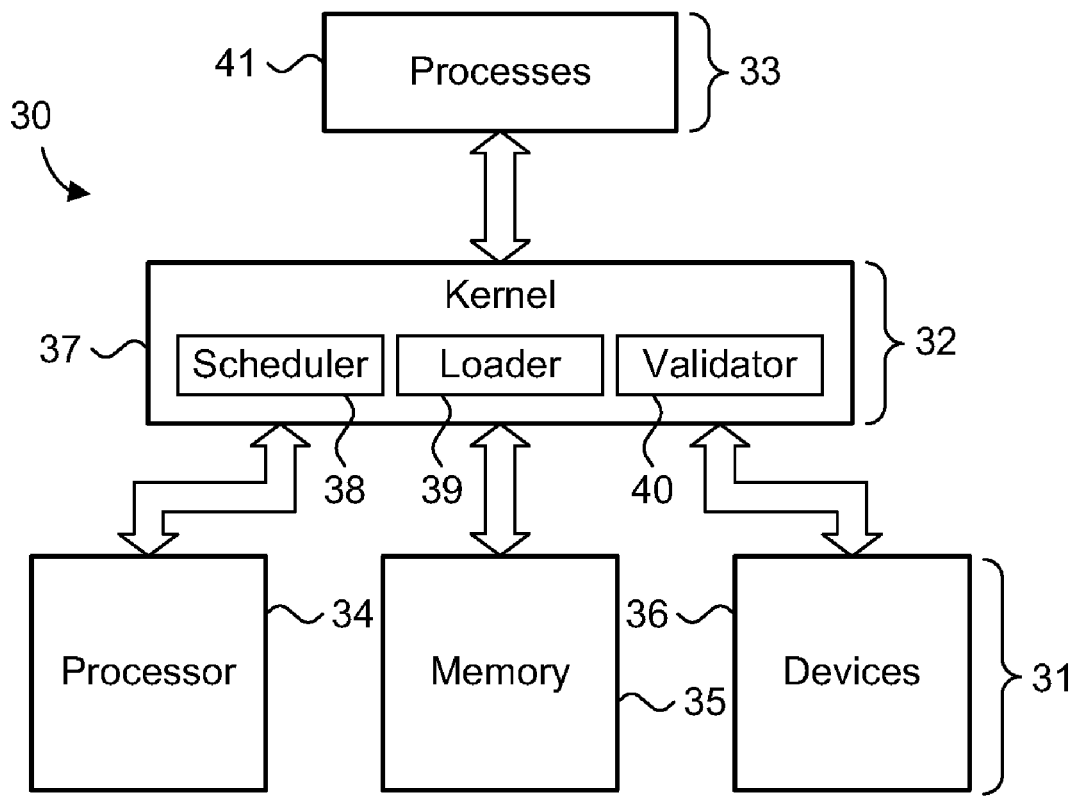
FIG. 3 is a functional block diagram showing the logical architecture of an implantable medical device, in accordance with one embodiment.

To ensure continuity of IMD functionality, particularly life sustaining therapy, behavioral operations are executed in separate process partitions, which execute each process in separate address space and separate time. Separation is provided through a high integrity kernel, which provides an operating system that executes over the physical component of the IMD. The processes, kernel, and physical components constitute the logical architecture. FIG. 3 is a functional block diagram showing the logical architecture 30 of an implantable medical device, in accordance with one embodiment. The high integrity kernel ensures fault resilient processing to curtail fault propagation specifically not addressed through hardware only redundancy.

The hardware and software components can be logically modeled in three layers, including a hardware layer 31, operating system layer 32, and application software layer 33. The operating system layer 32 manages the hardware resources via a high integrity kernel 37 in response to control requests received from processes 41 in the application software layer 33. The hardware resources include execution on the processor 34, read and write requests to the memory 35, and input and output to devices 36, such as the transducer circuitry 26 and therapy control circuitry 27. Other hardware layer components are possible. For instance, the kernel 37 in the operating system layer 32 could use hardware timers to control the execution of the processes 41 in the application software layer 33.

Resilience to fault propagation is provided through the high integrity kernel 37. The kernel 37 separates the behavioral operation of the IMD into distinct process partitions within which each of the processes 41 are executed in completely separate address space and time, as further described below respectively with reference to FIGS. 5 and 6. The kernel 37 includes a scheduler 38 that allots processor time to the processes 41 by priority and execution model, that is, event-driven or preemptive, as further described below with reference to FIG. 7. The kernel 37 also includes a loader 39 that strictly enforces exclusive write control over the memory 35, as further described below with reference to FIG. 8. Finally, the kernel includes a validator 40, which exercises control over data exchanged between the blocks of memory space assigned to individual processes 41, as further described below with reference to FIG. 9. Other kernel components are possible.

Alone, a stored program computer architecture is generally insufficient to ensure a reduction of fault propagation between processes 41. For instance, unsupervised data exchange between different processes risks memory corruption or runtime semantic errors due to data values out-of-bounds Four properties can reduce fault propagation between processes. The properties can include:

(1) Each process partition operates autonomously from every other process partition.

(2) No interaction between process partitions is allowed to adversely affect the operation of another process partition. The exchange of data from a sending process partition is validated before use by a receiving process partition.

(3) Address space separation is implemented in hardware.

(4) Time separation requires that the implementation of high integrity kernel manage the execution of all process partitions and input and output.

The foregoing properties can be implemented in the IMD through a combination of the kernel components in the operating system layer 32 and the hardware components in the hardware layer 31.

Process Partitions

Figure 4:
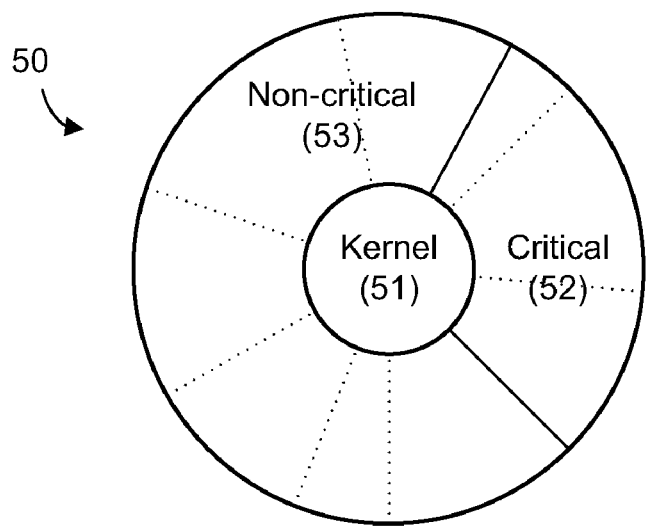
FIG. 4 is a diagram showing, by way of example, partitioned process allocation within the implantable medical device of FIG. 3.

Partitioning the processes 41 into completely separate address spaces and to execute in separate time quantums can significantly reduce fault propagation. FIG. 4 is a diagram showing, by way of example, partitioned process allocation 50 within the implantable medical device of FIG. 3. A high integrity kernel 51 executes in the lowest layer of software abstraction over which critical processes 52 and non-critical processes 53 execute. Process partitions provide fault containment by effecting the separation of both critical and non-critical processes in terms of memory space and execution time. Process partitions also facilitate efficient resolution of errant processes. When necessary, the high integrity kernel 51 can directly address runtime faults, for instance, by terminating a process partition; ignoring the partition by not scheduling further execution; restarting the partition completely; restarting the partition in a degraded mode; starting an alternate partition; or transferring critical functionality to a different partition. Other forms of fault resolution are possible.

Absent the high integrity kernel 51, processes would generally be treated alike and critical functions could be inopportunely interrupted or bad data could be passed from a misbehaving process to a correctly-executing process with risk of causing further error. Thus, the kernel 51 functions as a protected supervisor that prioritizes processor time scheduling based on criticality and execution model. The kernel 51 also enforces validated data exchange, particularly from non-critical processes 53 to critical processes 52 ("up-passing"), as well as from critical processes 52 to non-critical processes 53 ("down-passing").

Cooperatively Scheduled Processes

Purely hardware-based context switching between executing processes can result in improper execution of non-interruptible resources. Processes can employ event-driven or preemptive execution models. In an IMD, for instance, a execution thread responsible for delivering endocardial electrical therapy could be hindered by interruption in favor of a lead impedance execution thread. Allocating the processor time needed by the therapy execution thread before relinquishing the processor to the lead impedance execution thread would ensure that the more critical process, therapy delivery, takes precedent over the less critical process, lead impedance.

Figure 5:
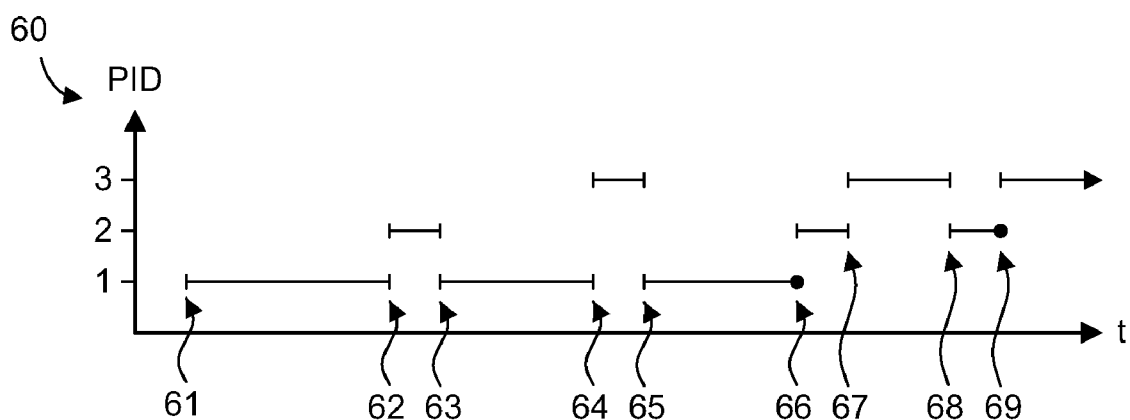
FIG. 5 is a timing diagram showing, by way of example, cooperatively and preemptively scheduled processes as executed on the implantable medical device of FIG. 3.

A hybrid form of cooperative and preemptive multitasking ensures correct process scheduling. FIG. 5 is a timing diagram showing, by way of example, cooperatively and preemptively scheduled processes 60 as executed on the implantable medical device of FIG. 3. The x-axis represents time and the y-axis represents the process identifier. Three processes, respectively assigned process identifiers (PIDs) '1,' '2,' and '3,' are scheduled for execution. PID 1 is a critical process, while PIDs 2 and 3 are non-critical processes. The execution threads for critical processes receive higher execution priority and are allotted processor time, which is interrupted only when waiting on the occurrence of an asynchronously-sensed event or by voluntary relinquishment. The execution threads for non-critical processes receive nominal time quantums to prevent process starvation.

At the onset of operations, the execution thread for critical process PID 1 is started first (point 61). The execution thread executes until the processor is released by PID 1 (point 62), when the execution thread for non-critical process PID 2 is started (point 62). PID 2 executes for a nominal time quantum until PID 1 resumes (point 63). Similarly, the execution thread for PID 3 is started when PID 1 again releases the processor (point 64). PID 3 also executes for a nominal time quantum (point 65). Upon completion of PID 1 (point 66), PIDs 2 and 3 can be preemptively executed (points 67-69), absent reliance on asynchronously-sensed events. Thus, both cooperative and preemptive scheduling are utilized to ensure continuity of non-interruptible resources, particularly critical processes.

It will be appreciated that there are various ways in which criticality and/or priority of execution can be assigned. Table 1 below shows one schema for assigning priority of execution for partitioned processes.

TABLE 1

| Process Category | Criticality/Priority of Execution |
|---|---|
| 1. Therapy Output | First |
| 2. Patient Diagnostics | Second |
| 3. Telemetry | Third |
| 4. Device Diagnostics | Fourth |

In the example of Table 1, processes necessary for therapy output, such as electrical stimulation, are assigned the highest priority of execution. Processes necessary for patient diagnostics functions are assigned the second highest priority of execution. Processes necessary for device telemetry are assigned the third highest priority of execution. Processes necessary for device diagnostics are assigned the fourth highest priority of execution. As described herein, the assigned priority of execution can be significant in terms of process scheduling and data validation, amongst other things.

In some embodiments the assigned priority of execution for processes can deviate from that shown in Table 1. By way of example, in some embodiments device diagnostics may not be the fourth highest priority of execution, but the third or second for example. In some embodiments, processes necessary for delivering therapy are assigned the highest priority of execution and patient diagnostics, telemetry, and device diagnostics are all assigned an equal priority of execution that is second highest.

It will be appreciated that the specific processes falling within a given category may vary based on the device functionality, platform, etc. However, as an example, processes falling under the category of those necessary for therapy output can include processes for controlling discharge of capacitors and timing regarding the same, processes for cardiac sensing beat to beat, tachyarrhythmia detection algorithms, and the like. Examples of processes that can fall under the category of patient diagnostics can include processes for pacing counters, histograms, heart rate variability, and the like. Examples of processes that can fall under the category of device diagnostics can include daily memory integrity testing.

It will be appreciated that there are some processes which may operate at the kernel level and may not be partitioned. Examples of these processes can include reset of partition memory, reset and/or restart of the processor, and certain types of hardware I/O operations. For that reason, priority of execution as described in Table 1 refers to priority of execution with regard to partitioned processes. Exemplary partitioning, such as memory partitioning, is described in greater detail as follows.

Memory Partitioning

Figure 6:
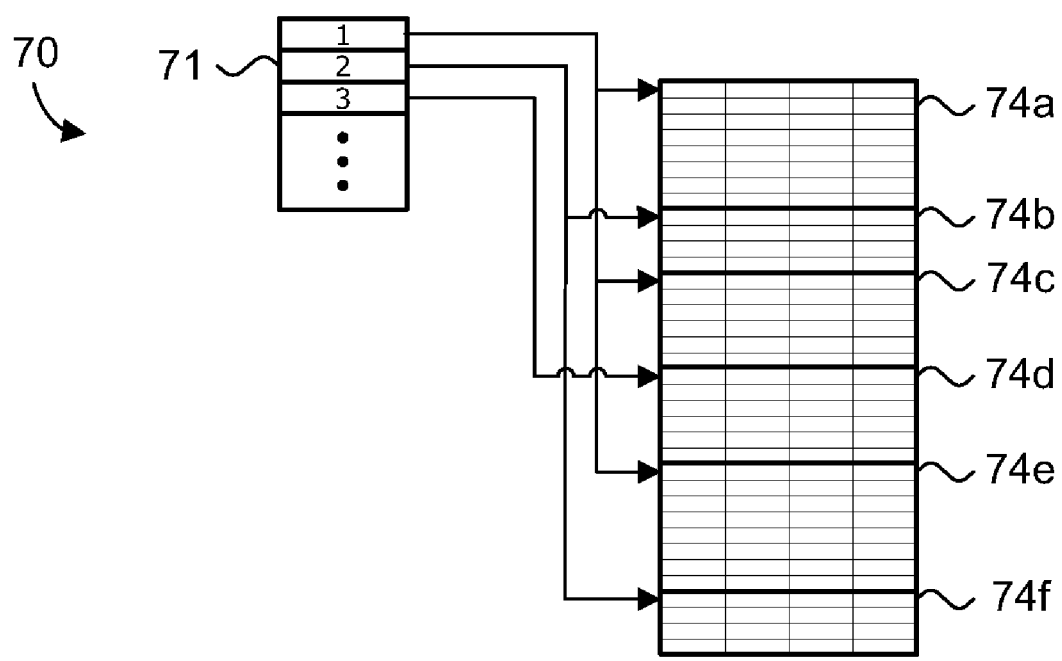
FIG. 6 is a diagram showing, by way of example, memory partitioning within the implantable medical device of FIG. 3.

Process partitions assign separate address spaces to individual processes through hardware-controlled memory management and kernel-arbitrated data exchange. FIG. 6 is a diagram showing, by way of example, memory partitioning 70 within the implantable medical device of FIG. 3. The execution threads for critical and non-critical processes are tracked through a process ID table 71. In some embodiments, critical processes are those processes falling under process category number one of Table 1 while non-critical processes are those falling under other categories of Table 1. In other embodiments, delineation between critical and non-critical processes can be determined differently. The address lines of a memory space 72 are mapped to each of the execution threads. For instance, the PID for each execution thread can be associated with discrete contiguous blocks of the memory space 72. For example, PID 1 is assigned discrete memory space blocks 74a, 74c, and 74e. Similarly, PID 2 is assigned memory space block 74b and 74f, while PID 3 is assigned only memory space block 74d.

The mapping of PIDs to blocks of the memory space 72 serve to tag the memory locations, which can be checked at a hardware level through the memory management unit 25 (shown in FIG. 2). A fault is flagged if an incorrect execution thread attempts to access a memory space block assigned to a different execution thread. Otherwise, the memory access is allowed to proceed.

At runtime, modifications to the memory space 72 are restricted to a single process, the loader 39 (shown in FIG. 3), which is the only process permitted to write into the memory space 72 on behalf of any of the execution threads. However, multiple execution threads can read from the same block of the memory space 72 without risk of memory corruption.

Additionally, the exchanging of data between executing threads is controlled by the validator 40, which validates data values to protect against cross process partition taint. To lower the overhead necessitated by data exchange validation, a higher level of rigor in validating up-passed data is applied, where the greatest need for reducing fault propagation is required.

Scheduling Methodology

Figure 7:
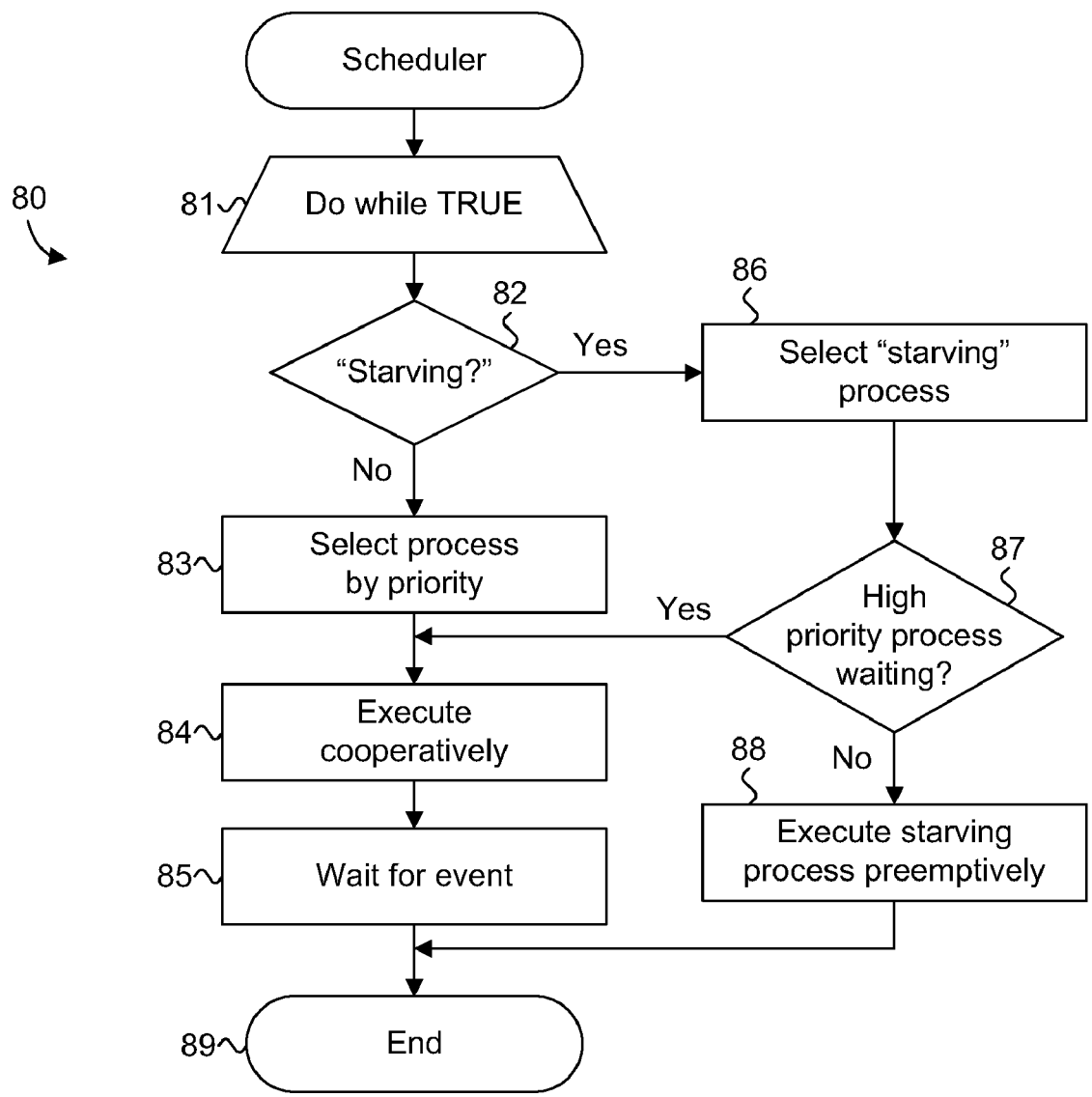
FIG. 7 is a flow diagram showing a method for execution thread scheduling, in accordance with one embodiment.

A hybrid model of cooperative and preemptive multitasking is implemented by the schedule 38 of the high integrity kernel 37. FIG. 7 is a flow diagram showing a method 80 for execution thread scheduling, in accordance with one embodiment. Scheduling is performed as a continuous process (steps 81-89). During each scheduling cycle, the currently executing threads are evaluated by a watchdog process that determines whether any of the execution threads are "starving," that is, not receiving a nominal amount of processor time. Absent starving execution threads, the execution thread for the process currently having the highest priority, that is, criticality, is selected (step 83) and cooperatively executed (step 84). Cooperative execution allows the process to continue executing until blocked on an asynchronously sensed event (step 85) or the execution thread voluntarily relinquishes the processor. When encountered (step 82), any "starving" execution thread will be selected for execution (step 86), provided that no higher priority process is waiting for immediate execution (step 87). Thereafter, the "starving" execution thread is allowed to execute preemptively (step 88) over the nominal time quantum assigned to that process.

Data Loading Methodology

Figure 8:
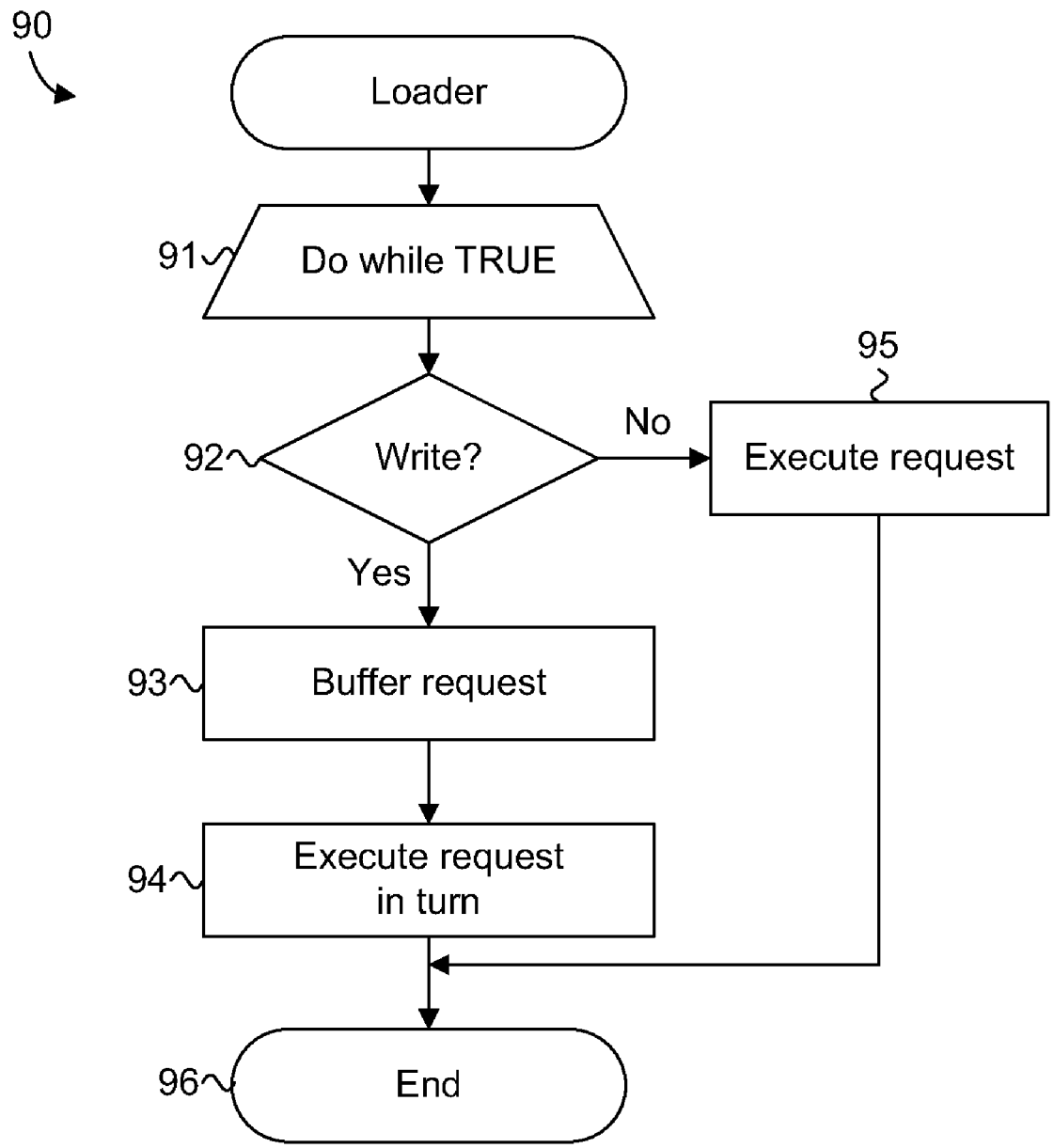
FIG. 8 is a flow diagram showing a method for data loading, in accordance with one embodiment.

Access requests by execution threads are arbitrated by the loader 39 of the high integrity kernel 37. FIG. 8 is a flow diagram showing a method 90 for data loading, in accordance with one embodiment. Data loading is performed as a continuous process (steps 91-96). During each data loading cycle, an execution thread can either request a data value to be read from or written into a memory location. Assuming the execution thread is making a request within only the block of memory space assigned, a write request (step 92) will first be buffered (step 93) and executed in turn with any other buffered write requests (step 94). The buffering ensures that write requests are unidirectional and are performed in sequence of receipt. Conflicting write requests are avoided by restricting memory writes to the loader 39. Read requests (step 92) can be executed (step 95) without risk of memory corruption, even where multiple execution threads are reading simultaneously from the same memory location.

Data Validation Methodology

Figure 9:
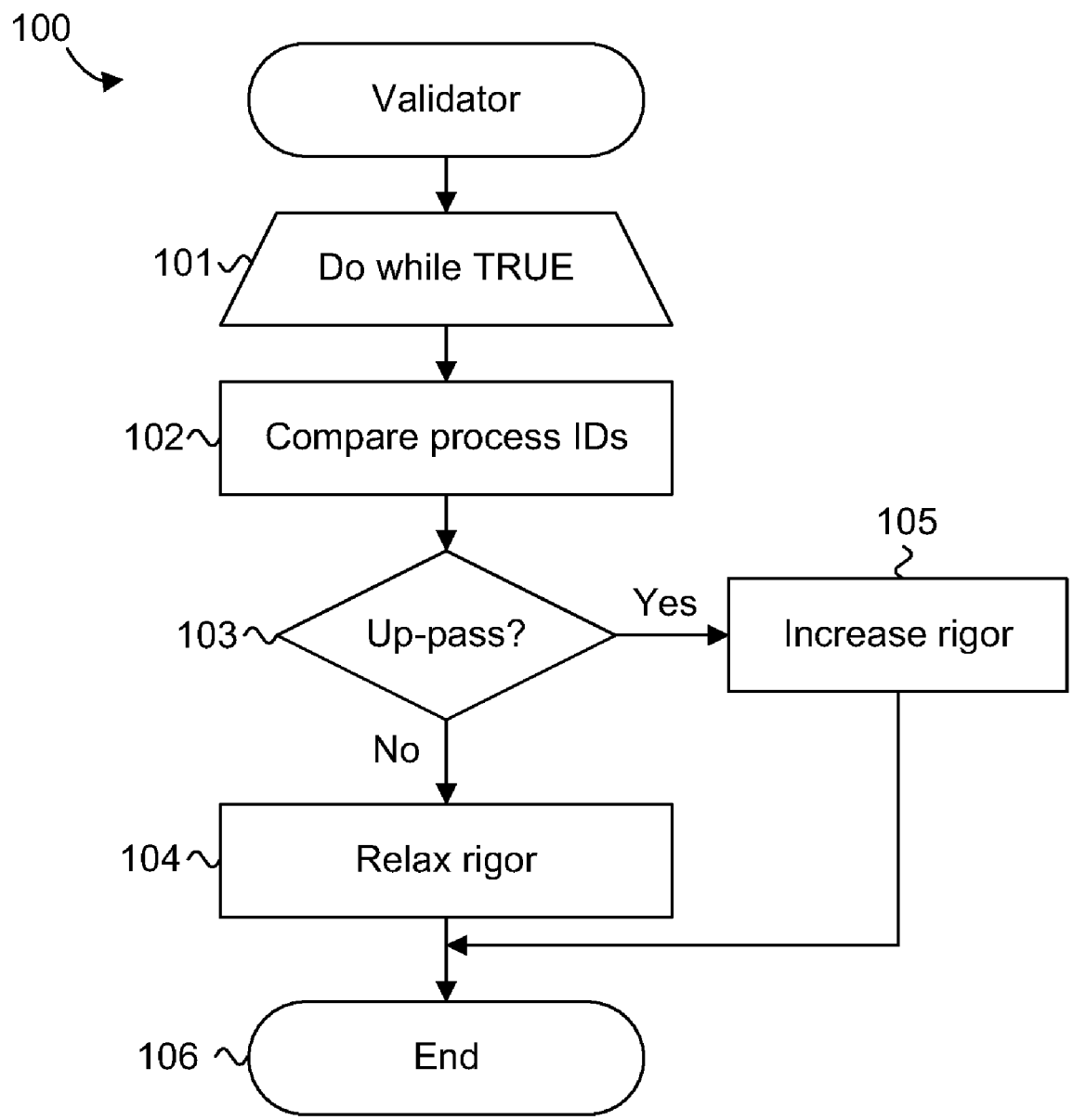
FIG. 9 is a flow diagram showing a method for data validation, in accordance with one embodiment.

Protection against cross-process partition taint is provided through the validator 40 of the high integrity kernel 37. FIG. 9 is a flow diagram showing a method 100 for data validation, in accordance with one embodiment. Data validation is performed as a continuous process (steps 101-106). During each data validation cycle, the process identifiers that are associated with the requesting and receiving execution threads are compared (step 102). If an execution thread for a critical process is sending data to an execution thread for a non-critical process, or a sending execution thread with a higher priority is sending data to a receiving execution thread with a lower priority (step 103), the amount of rigor applied to the data being exchanged is relaxed (step 104). However, if an execution thread for a non-critical process is sending data to an execution thread for a critical process, or a sending execution thread with a lower priority is sending data to a receiving execution thread with a higher priority (step 103), the amount of rigor applied to validate the data exchange is increased (step 105).

"Rigor" refers to the level of evaluation or scrutiny applied to the data being exchanged. An increased or enhanced level of rigor applies checks to ensure data integrity, such as checking freshness of new data values, or for existing data values, checking minima, maxima, magnitude, quantum, or other independent measures of change, as appropriate to the data type. A decreased or relaxed level of rigor provides for less stringent checking of the data, which may help alleviate the overhead introduced by validation. As non-critical functions can be terminated without endangering continued device operation, that is, critical life-sustaining functions, a degree of potential fault propagation through a down-pass can be tolerated in lieu of processing overhead. Issues of processing overhead are particularly acute in the context of implantable medical devices.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing fault resilient processing in an implantable medical device, comprising:
   an implantable medical device comprising a processor and memory store; and
   a high integrity kernel configured to execute on the processor and evaluate a priority of execution for each partitioned process, wherein processes necessary for therapy output are assigned the highest priority of execution amongst partitioned processes, the high integrity kernel comprising:
   a scheduler configured to schedule separate times on the processor to a plurality of processes;
   a data loader configured to manage separate memory spaces in the memory store by exclusively associating one such separate memory space with each of the processes; and
   a data validator configured to selectively validate data prior to exchange from one of the processes to another of the processes during execution in the separate processor times based on the priority of execution for each process; wherein selectively validating data comprises increasing a level of rigor in the validating of the data for processes having a higher priority of execution.

2. The system of claim 1, wherein processes with higher priorities of execution are scheduled before other processes.

3. The system of claim 1, wherein processes necessary for diagnosing a patient receive the second highest priority of execution amongst partitioned processes, processes necessary for system telemetry receive the third highest priority of execution amongst partitioned processes, and processes necessary for device diagnostics receive the fourth highest priority of execution amongst partitioned processes.

4. The system of claim 1, wherein the high integrity kernel allocates the separate processor times through process partitions, further comprising:
   a fault resolver configured to resolve runtime faults within one such process partition, comprising at least one of terminating the process partition, ignoring the process partition, restarting the process partition completely, restarting the process partition in a degraded mode, starting an alternate process partition, and transferring functionality of the process partition to a different process partition.

5. The system of claim 1, further comprising:
   discrete blocks of the memory space assigned into each such separate memory space, wherein exclusive write control is exercised over memory locations within each such discrete block of the memory space.

6. The system of claim 1, further comprising:
   a nominal quantum of processor time determined for the processes, wherein at least the nominal quantum is allotted to each of the processes in the separate processor times.

7. The system of claim 1, wherein access to the one such separate memory space is restricted to the associated process.

8. The system of claim 1, further comprising at least one of:
   a cooperative scheduler configured to block the execution of one such process upon an occurrence of waiting for an event or voluntary relinquishment of the processor; and
   a preemptive scheduler configured to block the execution of one such process upon expiration of a quantum of processor time.

9. The system of claim 1, wherein the implantable medical device is an active implantable medical device.

10. The system of claim 1, wherein the implantable medical device is selected from the group comprising a pacemaker, implantable cardioverter-defibrillator, cardiac resynchronization device, neuromodulation device, implantable sensor, and implantable monitor.

11. A system for partitioning an implantable medical device for fault resilient execution, comprising:
    an implantable medical device, comprising:

a uniprocessor; and
a memory store interconnected to the uniprocessor and comprising addressable memory locations;
a time partition configured to operationally separate a plurality of processes, comprising:
a criticality of function provided by each process; and
a scheduler configured to schedule separate times for execution on the uniprocessor to the processes in order of the criticality of function; and
a space partition configured to physically separate the plurality of processes, comprising:
discrete blocks of the addressable memory locations of the memory store associated to each of the processes; and
a data validator configured to selectively validate data sent from one of the processes to another of the processes during execution on the uniprocessor; and
a prioritization module configured to prioritize the processes by the criticality of function, wherein a level of rigor in the validating of the data is increased for those of the processes having the higher criticality of function, and a level of rigor in the validating of the data is decreased for those other of the processes.

12. The system of claim 11, further comprising:
a prioritization module configured to prioritize the processes by the criticality of function, wherein those processes with higher criticality of function receive the higher priorities of execution;
a cooperative scheduler configured to cooperatively allot the separate execution times to those of the processes having the higher priorities of execution; and
a preemptive scheduler configured to preemptively allot the separate execution times to those other of the processes.

13. The system of claim 11, further comprising:
a process identifier assigned to each of the processes during the separate execution times, wherein each process identifier is associated with the one such separate memory space of the assigned process.

14. The system of claim 11, wherein the implantable medical device is selected from the group comprising a pacemaker, implantable cardioverter-defibrillator, biventricular pacemaker, implantable sensor, and implantable monitor.

15. A method for partitioning an implantable medical device for fault resilient execution, comprising:
providing a uniprocessor and interconnected memory store comprising addressable memory locations in an implantable medical device;
operationally separating a plurality of processes, comprising:
evaluating a criticality of function provided by each process; and
scheduling separate times for execution on the uniprocessor to the processes in order of the criticality of function; and
physically separating the plurality of processes, comprising:
associating discrete blocks of the addressable memory locations of the memory store to each of the processes;
selectively validating data sent from one of the processes to another of the processes during execution on the uniprocessor; and further comprising
prioritizing the processes by the criticality of function;
increasing a level of rigor in the validating of the data for those of the processes having the higher criticality of function; and
decreasing a level of rigor in the validating of the data for those other of the processes.

16. The method of claim 15, further comprising:
prioritizing the processes by the criticality of function, wherein those processes with higher criticality of function receive the higher priorities of execution;
cooperatively allotting the separate execution times to those of the processes having the higher priorities of execution; and
preemptively allotting the separate execution times to those other of the processes.

17. The method of claim 15, further comprising:
assigning a process identifier to each of the processes during the separate execution times; and
associating each process identifier with the one such separate memory space of the assigned process.

18. The method of claim 15, wherein the implantable medical device is selected from the group comprising a pacemaker, implantable cardioverter-defibrillator, biventricular pacemaker, implantable sensor, and implantable monitor.

* * * * *